United States Patent [19]
Cielaszyk et al.

[11] Patent Number: 6,154,692
[45] Date of Patent: Nov. 28, 2000

[54] SPACECRAFT YAW POINTING FOR INCLINED ORBITS

[75] Inventors: David Cielaszyk, Mountain View; Nobi Furumoto, Sunnyvale; Matthew Machlis, Foster City, all of Calif.

[73] Assignee: Space Systems/Loral, Inc., Palo Alto, Calif.

[21] Appl. No.: 09/154,899

[22] Filed: Sep. 17, 1998

Related U.S. Application Data
[60] Provisional application No. 60/060,576, Oct. 1, 1997.

[51] Int. Cl.[7] .................. B64G 1/24; B64G 1/36
[52] U.S. Cl. .................. 701/13; 701/3; 701/4; 244/158 R; 244/164
[58] Field of Search ................ 701/13, 3, 4; 244/158 R, 244/164, 165, 171

[56] References Cited

U.S. PATENT DOCUMENTS

| 4,084,772 | 4/1978 | Muhlfelder | 244/165 |
| 4,521,855 | 6/1985 | Lehner et al. | 701/13 |
| 4,848,706 | 7/1989 | Garg et al. | 244/169 |
| 4,911,385 | 3/1990 | Agrawal et al. | 244/165 |
| 5,098,041 | 3/1992 | Uetrecht | 244/164 |
| 5,100,084 | 3/1992 | Rahn et al. | 244/165 |
| 5,184,139 | 2/1993 | Hirako et al. | 342/354 |
| 5,205,518 | 4/1993 | Stetson, Jr. | 244/165 |
| 5,308,024 | 5/1994 | Stetson, Jr. | 244/165 |
| 5,311,435 | 5/1994 | Yocum et al. | 701/226 |
| 5,452,869 | 9/1995 | Basuthakur et al. | 244/164 |
| 5,528,502 | 6/1996 | Wertz | 364/459 |
| 5,655,735 | 8/1997 | Wirthman et al. | 244/165 |
| 5,687,084 | 11/1997 | Wertz | 364/459 |
| 5,738,309 | 4/1998 | Fowell | 244/171 |
| 5,752,675 | 5/1998 | Holmes et al. | 244/168 |
| 5,791,598 | 8/1998 | Rodden et al. | 244/165 |

FOREIGN PATENT DOCUMENTS

| 0 460 935 A2 | 12/1991 | European Pat. Off. |
| 2434421 | 4/1980 | France. |
| 07291199 | 7/1995 | Japan. |

Primary Examiner—Michael J. Zanelli
Assistant Examiner—Eric M. Gibson
Attorney, Agent, or Firm—Perman & Green, LLP

[57] ABSTRACT

A method for use in a spacecraft for controlling yaw angle deviations from a desired yaw angle profile. The method includes the steps of: (a) operating a profile generator to output roll angle, pitch angle, yaw momentum, and yaw angle profiles, the profiles being calculated to meet spacecraft pointing requirements while operating in an inclined orbit; (b) inputting to an observer raw roll-axis sensor measurements, commanded and measured yaw-axis wheel momentum storage, measured pitch-axis wheel momentum storage, and external roll-axis and yaw-axis torques, the observer generating a yaw angle estimate and a yaw momentum estimate; (c) subtracting the yaw angle profile from the yaw angle estimate to obtain a difference value; and (d) using the difference value and the yaw momentum estimate to control roll-axis thruster firings to limit spacecraft yaw angle deviations from the yaw angle profile.

8 Claims, 10 Drawing Sheets

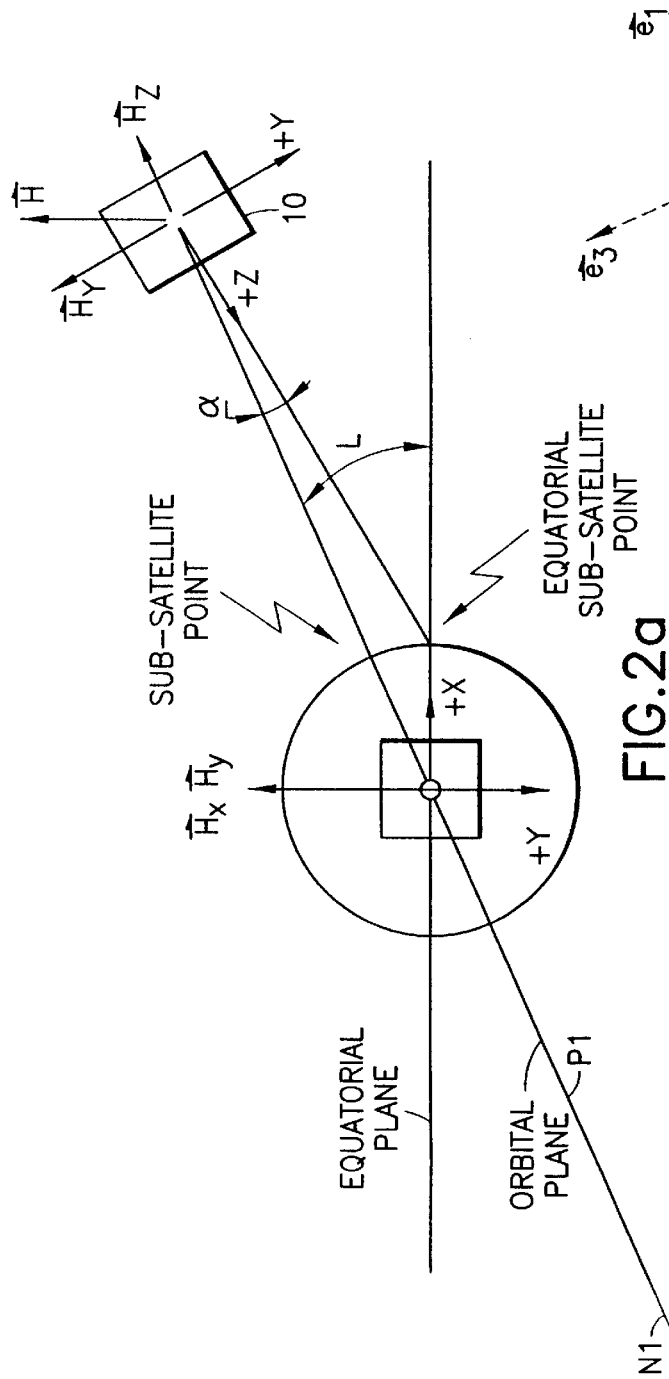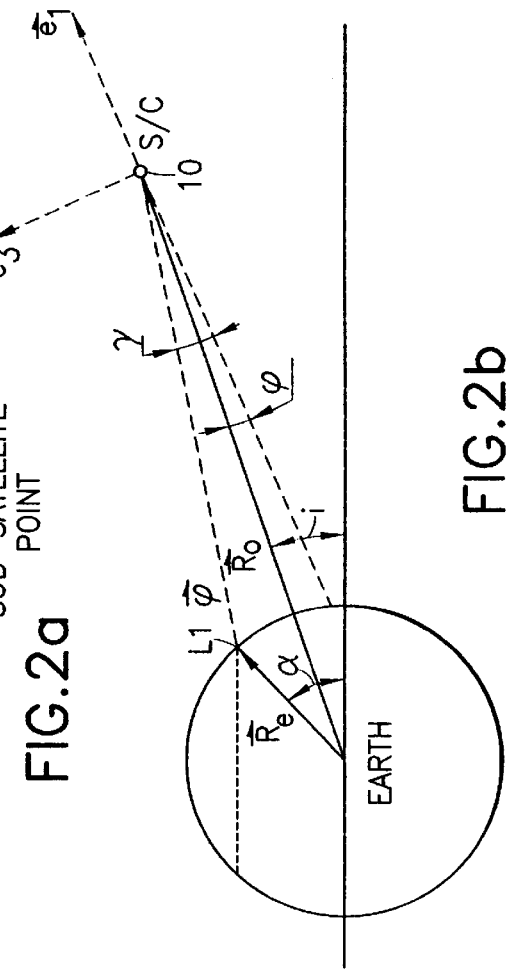

6,154,692

SPACECRAFT YAW POINTING FOR INCLINED ORBITS

CLAIM OF PRIORITY FROM A COPENDING PROVISIONAL PATENT APPLICATION

Priority is herewith claimed under 35 U.S.C. 119(e) from copending Provisional Patent Application 60/060,576, filed Oct. 1, 1997, entitled "Spacecraft YAW Pointing for Inclined Orbits", by David Cielaszyk, Nobi Furumoto, and Matthew Machlis. The disclosure of this Provisional Patent Application is incorporated by reference herein in its entirety.

FIELD OF THE INVENTION

This invention relates generally to spacecraft control methods and apparatus and, in particular, to methods and apparatus for providing spacecraft attitude control for spacecraft operating in inclined orbits.

BACKGROUND OF THE INVENTION

Inclined orbit operation of a spacecraft can extend the operational life of the spacecraft at the beginning and/or end of life. However, if North/South stationkeeping maneuvers (NSSK) are restricted, the inclination of the orbit will drift over time due to solar and lunar perturbations. This drift in the orbital inclination is undesirable.

OBJECT OF THE INVENTION

It is an object of this invention to provide an improved method and apparatus for providing yaw pointing control in a spacecraft having an inclined orbit.

SUMMARY OF THE INVENTION

The object of the invention is realized by a method and apparatus in accordance with embodiments of this invention, wherein raw or uncompensated roll-axis sensor measurements and commanded and measured yaw-axis wheel momentum are provided directly to a Long Term Momentum Management (LTMM) observer. Further in accordance with this invention a desired yaw angle profile, with respect to the orbit plane, is generated and provided to the LTMM observer, enabling control of yaw angle deviations from the desired yaw angle profile. The desired yaw angle profile may be derived from kinematics of pointing the spacecraft at the Earth, while maintaining the spacecraft momentum bias perpendicular to the Earth's equatorial plane in an inclined orbit.

A method is disclosed for use in a spacecraft for controlling yaw angle deviations from a desired yaw angle profile. The method includes the steps of: (a) operating a profile generator to output roll angle, pitch angle, yaw momentum, and yaw angle profiles, the profiles being calculated to meet spacecraft pointing requirements while operating in an inclined orbit; (b) inputting to an observer uncompensated roll-axis sensor (e.g., Earth sensor) measurements, commanded and measured yaw-axis wheel momentum storage, measured pitch-axis wheel momentum storage, and external roll-axis and yaw-axis torques, the observer generating a yaw angle estimate and a yaw momentum estimate; (c) subtracting the yaw angle profile from the yaw angle estimate to obtain a difference value; and (d) using the difference value in combination with the yaw momentum estimate to control roll-axis thruster firings to limit spacecraft yaw angle deviations from the yaw angle profile.

In a preferred embodiment of the invention the yaw angle profile and the yaw angle-estimate are both referenced to the orbit plane of the spacecraft, and the external roll-axis and yaw-axis torques are obtained from solar torque and thruster firing disturbance models.

The use of this invention provides a beneficial reduction in yaw-axis pointing errors resulting from solar torques and thruster firings.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2a and 2b show the spacecraft in an inclined orbit relative to the earth;

FIGS. 7a and 7b show curves representing exemplary roll and pitch angle profiles for exemplary cases in which it is assumed that a spacecraft axis is pointing to a location on the earth, as depicted in FIG. 2a;

DETAILED DESCRIPTION OF THE INVENTION

Figure 1:
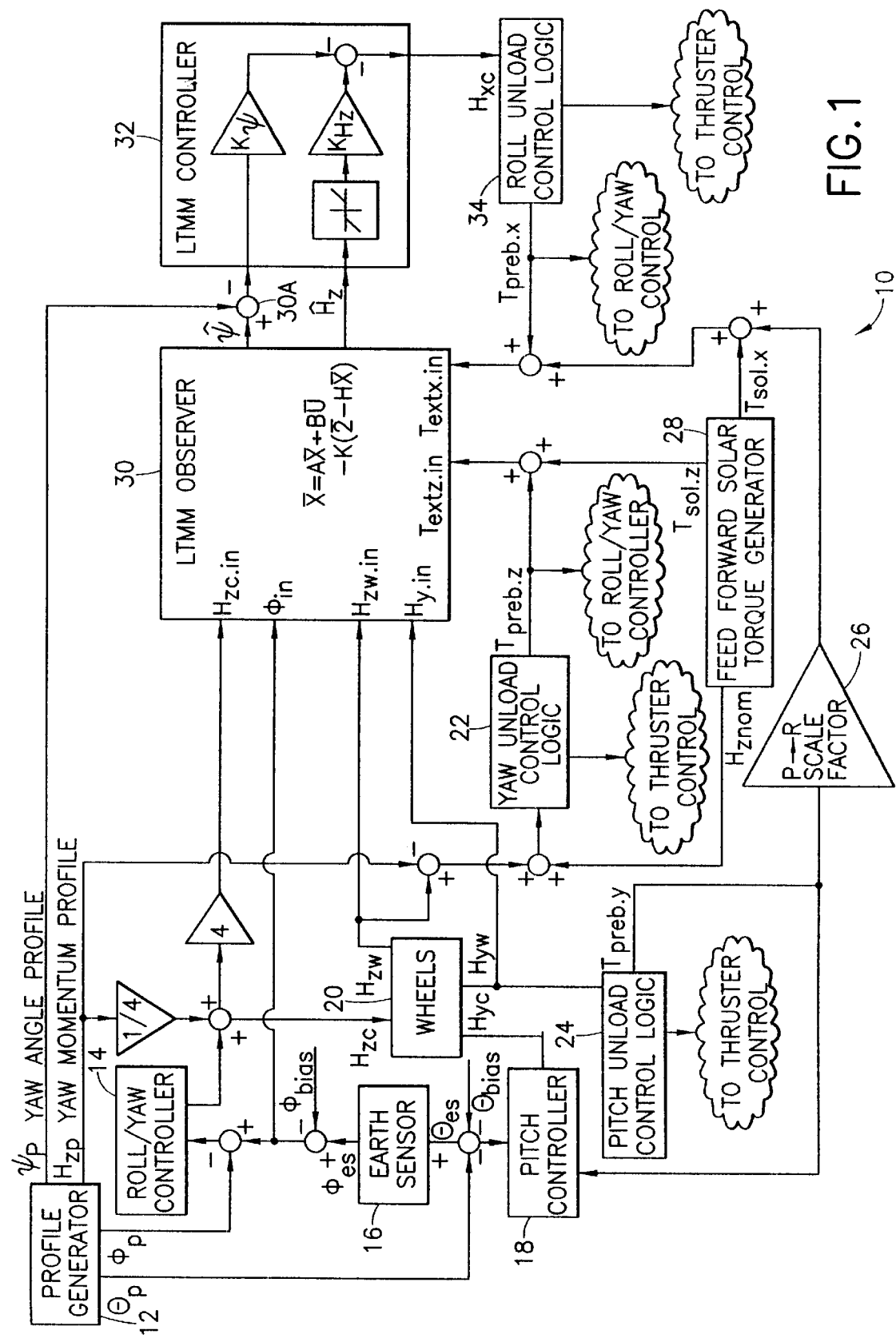
FIG. 1 is a block diagram of a portion of a spacecraft that is constructed and operated in accordance with the teachings of this invention.

FIG. 1 is a block diagram of a spacecraft 10 in accordance with this invention. The spacecraft 10 includes a profile generator 12 that operates to generate a desired yaw angle profile, with respect to the orbit plane of the spacecraft 10. The spacecraft is assumed, but not required, to be in an inclined geosynchronous orbit, with the inclination angle being in the range of, by example, about 3 degrees to about 10 degrees or larger. The desired yaw angle profile may be derived from kinematics of pointing the spacecraft 10 at the Earth, while maintaining the spacecraft momentum bias perpendicular to the Earth's equatorial plane in the inclined orbit.

The spacecraft 10 further includes a roll/yaw controller 14, an Earth sensor 16 providing a signal $\Phi_{ES}$ from which an alignment bias signal $\Phi_{BIAS}$ subtracted, a pitch controller 18, and a set of momentum wheels 20. The spacecraft further includes a yaw unload control logic block 22, a pitch unload control logic block 24, a P-R scale factors block 26, and a feed forward solar torque generator 28. Connected to outputs of these various blocks is a LTMM observer block 30 that provides outputs to a LTMM controller 32. One of the outputs, the yaw angle estimate, is combined with the yaw profile output from the profile generator 12. The LTMM controller 32 provides an output to a roll unload control logic block 34. The yaw, pitch and roll unload control logic blocks 22, 24 and 34, respectively, each provide an output to a spacecraft thruster control block (not shown).

The profile generator 12 outputs roll angle, pitch angle, yaw momentum, and yaw angle profiles. The profiles are calculated to meet spacecraft pointing requirements while operating in the inclined orbit. The LTMM observer 30 receives as input raw roll-axis sensor measurements, commanded and measured yaw-axis wheel momentum storage, measured pitch-axis wheel momentum storage, and external roll-axis and yaw-axis torques (from solar torque and thruster firing disturbance models). The yaw angle profile, which may be substantially sinusoidal, is subtracted at node 30A from the LTMM observer 30 yaw angle estimate (both referenced to the orbit plane) and sent to the LTMM controller 32. The difference value output from node 30A, along with the LTMM observer 30 yaw momentum estimate, is used to control roll-axis thruster firings and to thereby limit yaw angle deviations from the yaw angle profile.

In accordance with this invention the yaw angle estimated by the LTMM 30 is referenced to the spacecraft orbit plane rather than the Earth equatorial plane, based on uncorrected sensor and actuator data, resulting in reduced estimate error for an inclined orbit. With roll-axis control of yaw-axis pointing, yaw-axis pointing errors are reduced, and roll unload propellant usage is optimized. In addition, pointing profiles can be tailored to meet payload requirements, subject to some constraints, without degrading yaw pointing performance, enabling improved payload pointing.

It is also within the scope of this invention to employ a pitch profile which is used in a similar way as the yaw profile described above.

Reference is now made to FIG. 2a wherein a representation of the satellite 10 in an inclined orbital plane P1 is shown, and wherein the spacecraft 10 is assumed to be at an ascending node within the orbital plane P1 (in the following modelling analysis, an orbit-fixed reference frame is assumed, since spacecraft sensors and gravity gradients are preferably referenced to this frame). It is preferred that the spacecraft 10 has a yaw motion which is substantially sinusoidal, so that there is a positive angle of inclination at the ascending node and a negative angle of inclination at a descending node N1 within the orbital plane P1. A desired roll motion of the spacecraft 10 is substantially sinusoidal, and is 90 degrees out of phase with the yaw motion. The amplitude of this motion is determined as a function of the orbit inclination and orbit radius. Desired profiles are represented by the following equations (1)–(4):

$$\phi^o = -\alpha \sin\eta \quad (1)$$

$$\psi^o = \underline{i}\cos\eta \quad (2)$$

$$\eta = \omega_0(t-t_0) \quad (3)$$

$$\alpha \approx (R_O/R_E - 1)^{-1} \quad (4)$$

where $\underline{i}$ represents the orbit inclination angle, $R_O$ represents the orbit radius, $R_E$ represents the radius of the earth, $t_o$ represents the time of right ascension, $\omega_0$ represents the rate at which the satellite 10 orbits the earth, and wherein it is assumed, in accordance with one embodiment of the invention, that the spacecraft 10 follows a substantially circular orbit (in other embodiments, orbits with nonzero eccentricities may be employed, in which case, the profiles represented by equations (1)–(4) are somewhat modified).

Momentum profiles

In order to provide a desired spacecraft motion without changing the angular momentum vector (i.e., unloads), momentum profiles are provided. These profiles, which will be described below, assume that the momentum of the spacecraft 10 is perpendicular to the equatorial plane, are based on the conservation of angular momentum principle, and enable desired attitude profiles to be provided.

It is noted that unless unload deadbands are configured about these momentum profiles, erroneous unloads may occur as the satellite control system maintains roll and pitch attitude by rotating the angular momentum vector. The resulting attitude profile has zero roll and pitch error and a sinusoidal yaw error with an amplitude equal to the inclination angle. Momentum profiles are needed for all three principal spacecraft axes in order to maintain the spacecraft 10 in an ideal inclined orbital attitude. A roll momentum profile has a relatively small amplitude, and the resulting yaw attitude error (roll and pitch are controlled) may be managed with a small number of unloads. There is typically no need for a pitch momentum profile because of the high bandwidth of the pitch loop controller. The profiles set forth below indicate that a 0.08 Nms sinusoidal pitch signature at twice the orbital frequency is observed for inclined orbit operation.

Unloads are generally required to control the attitude of the spacecraft 10 in accordance with the desired profiles, owing to the absence of a roll momentum wheel in one embodiment of the invention. As such, LTMM 30 and unload parameter selections are important, as either roll or yaw unloads may be employed. Preferably, fuel efficient roll unloads are employed as opposed to yaw unloads for providing spacecraft 10 attitude control. It is preferred that the yaw unload deadband be approximately 0.3 Nms to 0.5 Nms so that the number of yaw unloads required is as small as possible. It is also preferred that the roll unload deadband be approximately 0.12 Nms to 0.16 Nms so that the number of thruster firings that are based on the yaw estimate errors be as small as possible. In a simulation which assumed nominal unload parameters (e.g., roll=0.12 Nms, yaw=0.3 Nms), a pitch momentum bias of approximately 52.8 Nms for an L-wheel system mode, and a pitch momentum bias of approximately 82.5 Nms for a V-wheel system mode, it was determined that approximately 20 yaw unloads per day are needed to provide degraded pointing.

Momentum Profiles For Inclined Orbit Operation

The momentum profiles for the inclined orbit system operation will now be described. Assuming that the angular momentum vector is initially perpendicular to the equatorial plane, and has a magnitude of $H_N$, an analysis of torque-free motion of the spacecraft 10 yields the following momentum profiles (equations (5)–(7)), which enable the desired spacecraft motion to be provided:

$$h_x^* = H_N(\cos''\sin\underline{i}\cos\psi^* - \cos\underline{i}\sin\psi^*) - I_x(-\omega_o\sin\psi^* + \phi^*) \quad (5)$$

$h_y^* = -H_N (\cos''\sin\underline{i}\sin\psi^*\cos\phi^* + \cos\underline{i}\cos\psi^*\cos\phi^* + \sin''\sin\underline{i}\sin\phi^*)$ $-I_y(-\omega_o\cos\psi^*\cos\phi^* + \psi^*\sin\phi^*)$ (6)

$h_z^* = H_N (\cos''\sin\underline{i}\sin\psi^* + \cos\underline{i}\cos\psi^* - \sin''\sin\underline{i}\cos\phi^*)$ $-I_z(-\omega_o\cos\psi^*\sin\phi^* + \psi^*\cos\phi^*)$ (7)

where:

$\phi = -\alpha\sin\eta$ $\psi = \underline{i}\cos\eta$ $\eta = \omega_0(t - t_0)$ $\alpha \approx i(R_0/R_E - 1)$ and where $\underline{i}$, $R_o$, $R_E$, $t_o$, and $\omega_0$, were as described above.

It is noted that the gravity-gradient torque can add complexity to momentum profile generation. By example, additional terms for the momentum profiles which account for the effects of gravity-gradient torques can be determined based on the following time varying linear differential equation (8):

$$\dot{\vec{\delta h}} = -\vec{\omega} \times \vec{\delta h} + \vec{\delta T}$$ (8)

wherein angular velocity, angular momentum, and torques are defined in the body-fixed frame in accordance with the following equations (9)–(14):

$\omega_x^* = -\omega_o\sin\psi^* + \phi^*$ (9)

$\omega_y^* = -\omega_o\cos\psi^*\cos\phi^* + \psi^*\sin\phi^*$ (10)

$\omega_z^* = \omega_o\cos\psi^*\sin\phi^* + \psi^*\cos\phi^*$ (11)

$\delta\underline{T}_x = 3\omega_o^2(I_{zz} - I_{yy})\sin\phi^*\cos\phi^*$ (12)

$\delta\underline{T}_y = O$ (13)

$\delta\underline{T}_z = O$ (14)

Wheel Commands for Inclined Orbits

Spacecraft Pointing in Non-coincident Latitudes

For a general case in which the latitude of the target point on the earth and the latitude of the synchronous, nearly equatorial orbit are not coincident with one another, the required attitude for pointing an RF-boresight axis of the spacecraft 10 to the target point on the earth may be represented by equations (15) and (16):

$$\delta\phi = \frac{-(\delta R_o - R_E\delta x)C_{\theta^*}S_{\gamma^*} + R_E\delta y S_{\theta^*}S_{\gamma^*} + R_E\delta z C_{\gamma^*}}{\rho^*}$$ (15)

$$\delta\theta = \frac{-\rho^*S_{\gamma^*}\delta\psi + \rho^*\delta az - (\delta R_o - R_E\delta x)S_{\theta^*} + R_E\delta y C_{o^*}}{\rho^*C_{\gamma^*}}$$ (16)

where:

$$\delta x = C_{\alpha^*}S_{\lambda^*}\delta\eta + S_{\eta^*}S_{\alpha^*}\delta i - S_{\eta^*}C_{\alpha^*}S_{\eta^*,\lambda^*}\frac{\delta i^2}{2}$$ (17)

$$\delta y = C_{\alpha^*}C_{\lambda^*}\delta\eta + C_{\eta^*}S_{\alpha^*}\delta i - C_{\eta^*}C_{\alpha^*}S_{\eta^*,\lambda^*}\frac{\delta i^2}{2}$$ (18)

-continued $$\delta z = -C_{\alpha^*}S_{\eta^*+\lambda^*}\delta i - S_{\alpha^*}\frac{\delta i^2}{2}$$ (19)

where:

$$S_{0^*} = \frac{R_E C_{\alpha^*}S_{\lambda^*}}{\rho^*C_{\gamma^*}}$$ (20)

$$C_{0^*} = \frac{R_o^* - R_E C_{\alpha^*}C_{\lambda^*}}{\rho^*C_{\gamma^*}}$$ (21)

$$\rho^{*2} = R_o^{*2} - 2R_o^*R_E C_{\alpha^*}C_{\lambda^*} + R_E^2$$ (22)

$$S_{\gamma^*} = \frac{R_E S_{\alpha^*}}{\rho^*}$$ (23)

$$C_{\gamma^*} = \frac{R_o^* - R_E C_{\alpha^*}C_{\lambda^*}}{\rho^*C_{\theta^*}}$$ (24)

and further where:

$\alpha^*$ = the "target" latitude;

$\lambda^*$ = the "target" longitude (assuming the spacecraft 10 is located at zero longitude);

$\underline{i}$ = the inclination angle; and $\eta^* = \omega_0 t$ ($t$ is measured beginning from the ascending node).

The angle $\gamma^*$ is the elevation angle that the RF-boresight axis makes with the yaw axis about the roll axis of the spacecraft 10, and the angle $\delta az$ is the azimuth angle that the RF-boresight axis makes about the pitch axis in order to point to the "target" which is at a different longitude than the spacecraft 10.

The angle $\delta n$ is composed of $\delta n_1$, which represents a residual error in the spacecraft 10 in-plane orbital position after orbit control has been provided, and which also represents uncertainties in orbital parameters that affect the in-plane spacecraft 10 position. By example, the angle $\delta n$ may be represented by the following equation (25):

$$\delta\eta = \delta\eta, -\frac{3}{2}\cdot\frac{\delta T}{T}\omega_o t + 2\delta\epsilon S_{\omega_o t}$$ (25)

A second one of the terms of equation (25) represents a mean longitudinal drift rate of the spacecraft 10 away from stable longitude points, wherein the drift rate causes a westerly drift of a "figure eight" (described below), and where $\delta T$ represents an error in the orbital period away from the synchronous orbital period. Moreover, a third one of the terms of equation (25) represents the in-plane position error caused by orbit eccentricity error $\delta\epsilon$. Also, in equations (17)–(19), the term $\frac{1}{2}\delta i^2$ represents a longitudinal width (on the earth's surface) due to the inclination error, and, it is noted that a tilt of the "figure eight" is due to the eccentricity error and is equal to $2\delta\epsilon/\delta i$. A lopsidedness of the "figure eight" (i.e., a cross-over point of the "figure eight" occurring above or below the equator) appears when the argument of perigee is not at the ascending or descending nodes. The inclination angle itself causes the symmetric latitude excursion angles above and below the equator and governs the actual "height" of the "figure eight".

It is estimated that the uncertainties in $\delta T$ and $\delta E$ are approximately 0.03 sec (10 m uncertainty in semi-major axis) and 0.00002, respectively. These estimates translate to orbital position errors of about 0.006 degrees/month of longitudinal drift, and about 0.002 degrees of sinusoid at the orbital frequency for eccentricity errors. Since associated roll and pitch errors are approximately ⅙ of these values, the δn term may be neglected for the roll and pitch commands.

Commanded Wheel Momentum

Perturbed wheel momenta for small inclination angles are preferably combined with initial nominal angular momenta (for a zero inclination angle) and dictate commanded wheel moments for providing the desired attitudes for spacecraft pointing. By example, initial nominal angular momenta are $[0\ 0\ H_B - I_3\omega_o]$. Also, and as is noted in Appendix A below, it is assumed that centered body frame axes $[e_1, e_2, e_3]$ of spacecraft 10 correspond to respective "usual" spacecraft axes $[-z, +x, -y]$. This being the case, it can be said that the total commanded wheel momenta along the spacecraft 10 body principal axes may be represented by the following equations (26)–(28):

$$-h_z = h_1^* + \delta h_1 = 0 + H_B(S_\eta \cdot \delta i - \delta\phi) + I_1(\omega_o\delta\phi + \delta\psi) \quad (26)$$

$$h_x = h_2^* + \delta h_2 = 0 + H_B(C\eta \cdot \delta i - \delta\psi) + I_2(\omega_o\delta\psi - \delta\phi) \quad (27)$$

$$-h_y = h_3^* + \delta h_3 = (H_B - I_3\omega_o) - H_B\delta\frac{i^2}{2} + I_3\dot\theta \quad (28)$$

By substituting the desired attitude angles dictated by equations (15)–(24) into equations (26)–(28), momentum wheel commands can be determined. That is, these equations can be used to determine the desired momentum wheel profiles for a set of desired spacecraft pointing attitudes.

In an ideal case wherein the various parameters used to generate the momentum wheel commands accurately represent actual spacecraft dynamics, the usage of such momentum wheel commands for controlling the momentum wheels 20 results in the desired spacecraft attitudes being provided. Otherwise, if the various parameters used to generate the momentum wheel commands do not accurately represent the actual spacecraft dynamics, small errors (e.g., errors as small as 1% in the moments of inertia) can result in there being more significant errors during open loop operation.

A number of exemplary cases wherein wheel momentum profiles are provided will now be described. In the following exemplary cases, moment of inertia properties are assumed to have no errors, and it is assumed that the following parameter values are employed:

a. i=7 degrees
b. $R_E$=6,377 km
c. $I_1$=12,555 kgm² (−yaw)
d. $I_2$=12,182 kgm² (+roll)
e. $I_3$=1,794 kgm² (−pitch)
f. $H_B$=70 nms
g. $R_o$=42,222 km First exemplary case In a first exemplary case, it is assumed that terms $\delta R_o$, $\delta n$ and $\delta i^2$ are negligible. It is also assumed that the spacecraft 10 is to be pointed to a same longitude, and, as a result, $\lambda^*=0$ and $\theta^*=0$. In this case the roll and pitch commands $\delta\phi$ and $\delta\theta$, as determined in accordance with equations (15)–(24) set forth above, may be represented by the following equations (29) and (30):

$$\delta\phi = -KS_\eta \cdot \delta i \quad (29)$$

$$\delta\theta = \frac{R_E S_{\alpha^*}}{R_o - R_E C_{\alpha^*}}(C_\eta \cdot \delta i - \delta\psi) \quad (30)$$

where:

$$K = \frac{R_E}{\rho^*}C_{\gamma^*+\alpha^*} \quad (31)$$

In this exemplary case, two sub-cases, namely sub-cases (I) and (II), may be considered. The following assumptions are made for the respective sub-cases (I) and (II).

Sub-case (I): Yaw axis points to equator ($\alpha^*=\gamma^*=0$).

Sub-case (II): spacecraft RF boresight axis points to 40° latitude ($\alpha^*=40°$, $\gamma^*=6.265°$, $\lambda^*=0$).

As is indicated above, in sub-case (I) it is assumed that the spacecraft yaw axis points to the equator and the longitude of the initial nodal crossing (assumed to be the ascending node), and in sub-case (II), it is assumed that the RF boresight axis points to the same longitudinal point but to a latitude of 40°. A primary difference in these two sub-cases is in the magnitude of the roll angles necessary to point the desired axes to the desired point on the earth.

Figure 3A:
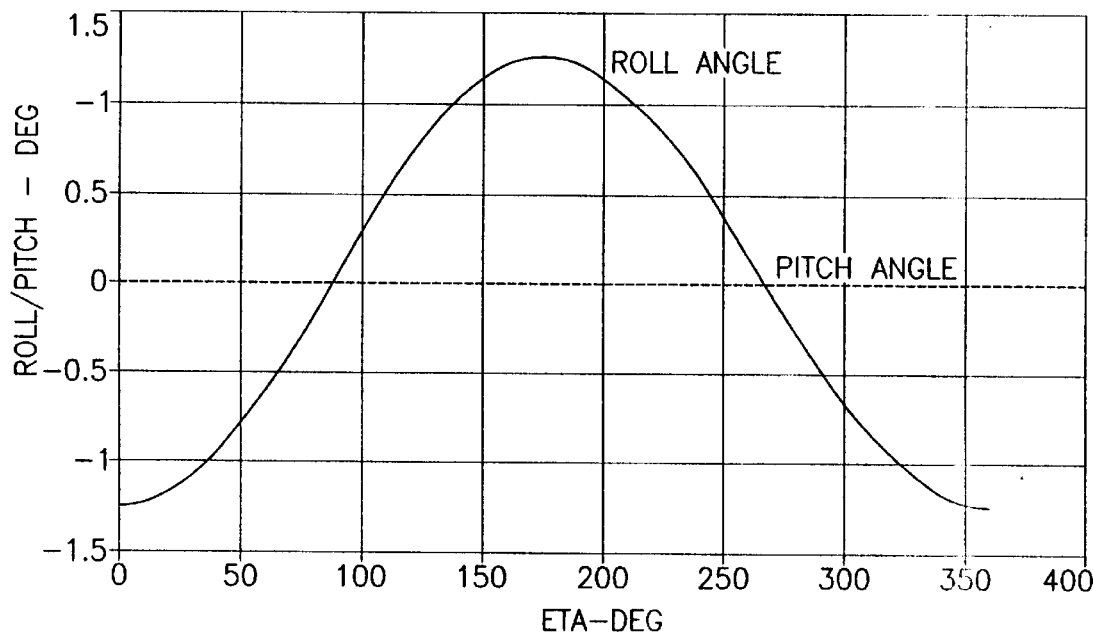
FIG. 3a shows a plot of spacecraft roll and pitch angles for an exemplary case wherein it is assumed that a yaw axis of the spacecraft points to a location at the equator of the earth.
Figure 3B:
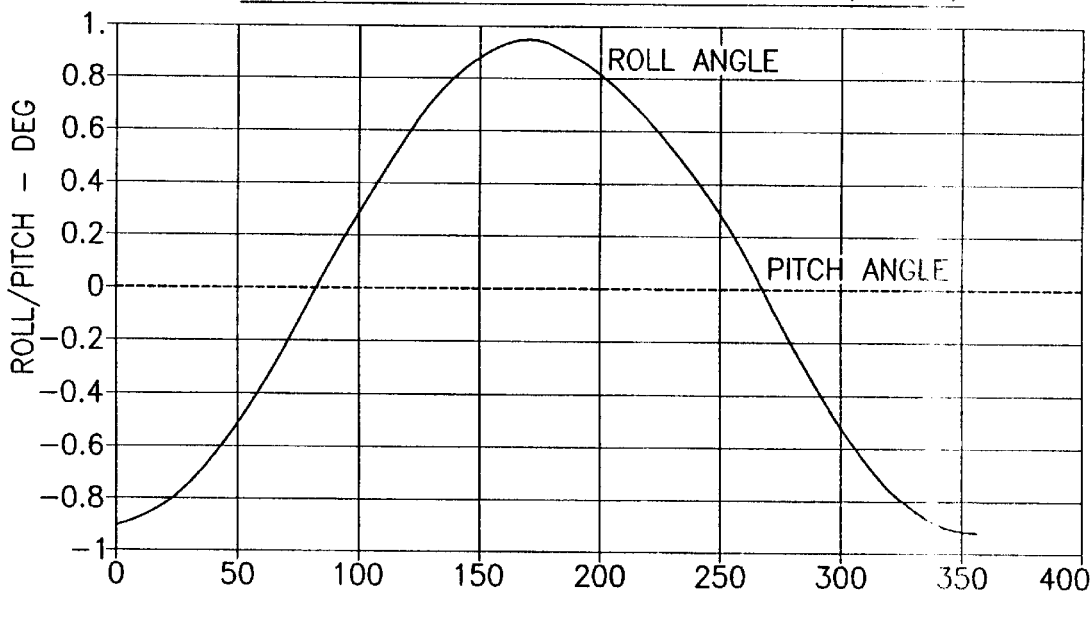
FIG. 3b shows a plot of spacecraft roll and pitch angles for an exemplary case wherein it is assumed that a RF axis of the spacecraft points to a location at about 40° latitude on the earth.
Figure 4A:
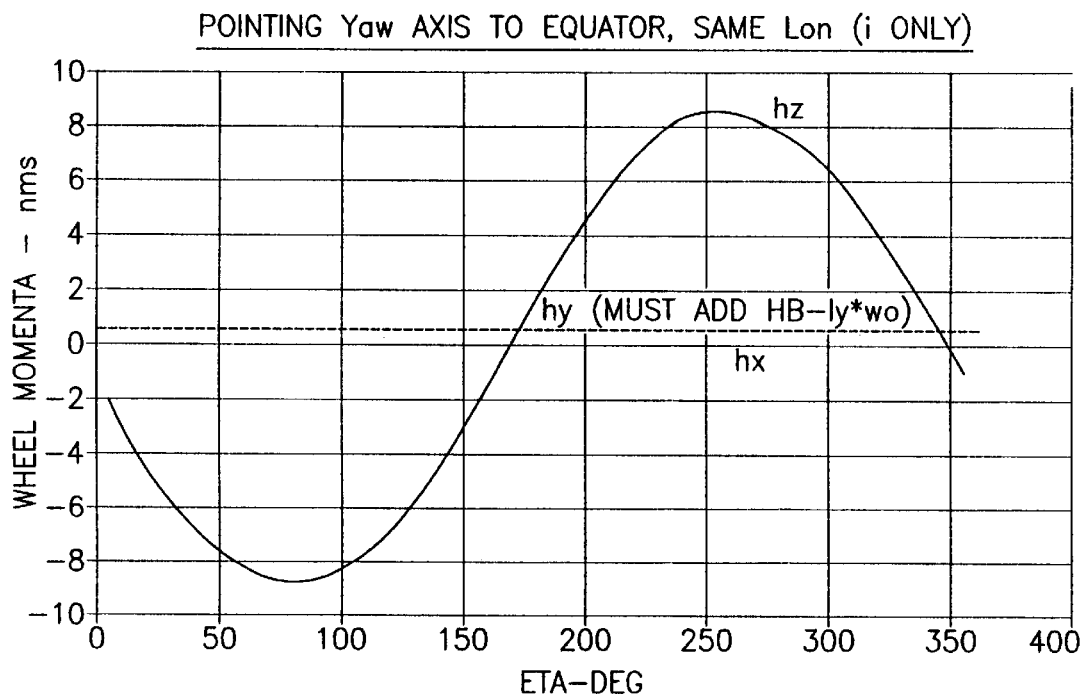
FIGS. 4a and 4b show curves representing spacecraft momentum wheel momenta values which enable the roll and pitch angles shown in respective FIGS. 3a and 3b to be provided.
Figure 4B:
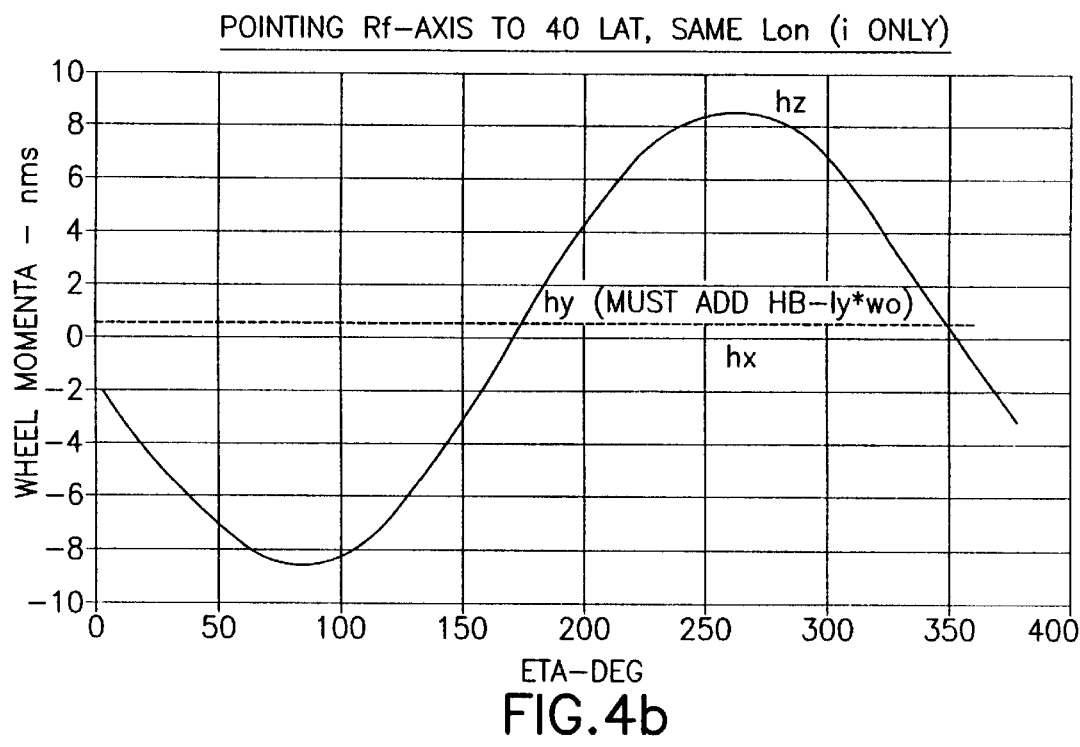

The longitudinal aim point for each of the sub-cases (I) and (II) is at a same longitude as that of the spacecraft 10, and thus the pitch bias is 0° and the RF boresight axis is elevated 6.265°. Plots of the roll and pitch angle profiles for sub-cases (I) and (II) are shown in FIGS. 3a and 3b with only the first order inclination term (i only). Differences between roll angles for sub-cases (I) and (II) are approximately 0.4 degrees, resulting in there being slight differences in the momentum wheel speed ranges required for enabling the desired attitudes for these sub-cases (I) and (II) to be provided. The pitch bias is zero and the pitch profile is essentially a constant at zero. Diagrams showing momentum wheel 20 momenta corresponding to the roll and pitch angles plotted in FIGS. 3a and 3b are shown in FIGS. 4a and 4b, respectively. It is noted that the most active momentum wheel is the yaw momentum wheel, which oscillates between about ±8.5 nms.

For a case wherein V-wheel control is employed, no wheel momentum storage capability along the roll axis ($e_2$) is provided. Hence, from equation (27), the stored wheel momentum is zero. Also, being that roll is controlled in this type of system, the yaw angle assumes values that are dictated by equation (27) being set equal to zero. By example, this results in the following equation (31) being provided.

$$\delta\psi = \frac{H_B + I_2\omega_o K}{H_B - I_2\omega_o}C_{\eta^*} \quad (31a)$$

Since $H_B$ is much greater than $I_2\omega_o$, and the absolute value of $\underline{K}$ is no greater than unity, equation (31a) can be rewritten as the following equation (32):

$$\delta\psi = \left[1 + \frac{I_2\omega_o}{H_B}(1+K)\right]\delta i C_{\eta^*} \quad (32)$$

Generally, the yaw motion for small inclinations is established at the initialization of the orbital and attitude conditions. The initial yaw angle (at the ascending node) is preferably chosen so as to be equal to the inclination angle, so that the yaw angle ideally becomes equal to a product of the inclination angle and $\cos(\omega_o t)$. By subtracting this ideal yaw angle from equation (32), the following equation (33) which represents yaw angle error is provided:

$$\delta\delta\psi = \frac{I_2\omega_o}{H_B}(1+K)\delta i C_{\eta^*} \quad (33)$$

For the sub-case (I), the amplitude of this yaw angle error is approximately 0.102 deg. Although yaw is not under direct control, the yaw angle error may be removed by providing an initial yaw angle which is less than the inclination angle by the amount of the yaw angle error. Under ideal yaw angle conditions, the commanded pitch displacement is zero.

Second exemplary case: Non-coincident longitudes

If the aim point for the spacecraft 10 is not at the same longitude as that of the spacecraft 10 at its ascending node crossing, some pitch motion is introduced. Again, only the first order inclination angle term is used.

Figure 5A:
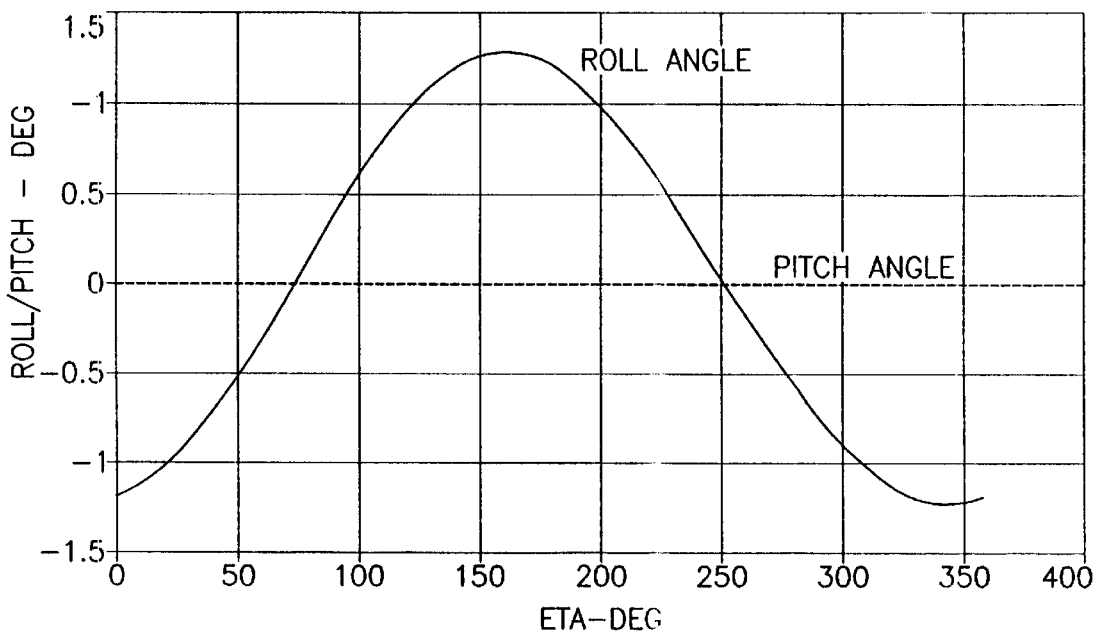
FIG. 5a shows another plot of spacecraft roll and pitch angles for an exemplary case wherein it is assumed that the yaw axis of the spacecraft points to a location at the equator of the earth.
Figure 5B:
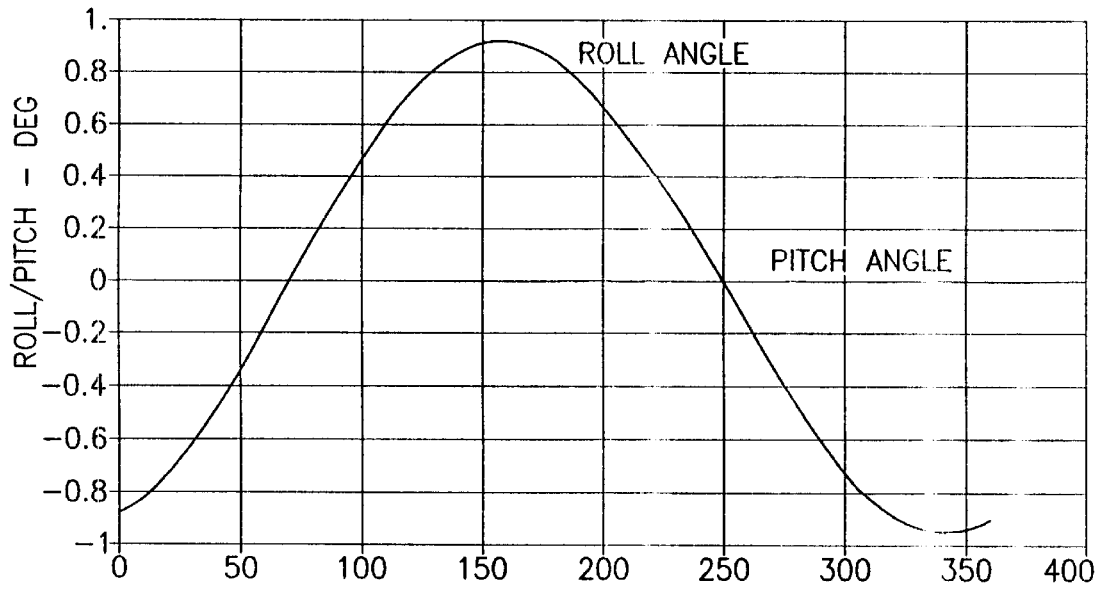
FIG. 5b shows another plot of spacecraft roll and pitch angles for an exemplary case wherein it is assumed that the RF axis of the spacecraft points to a location at about 40° latitude on the earth.
Figure 6A:
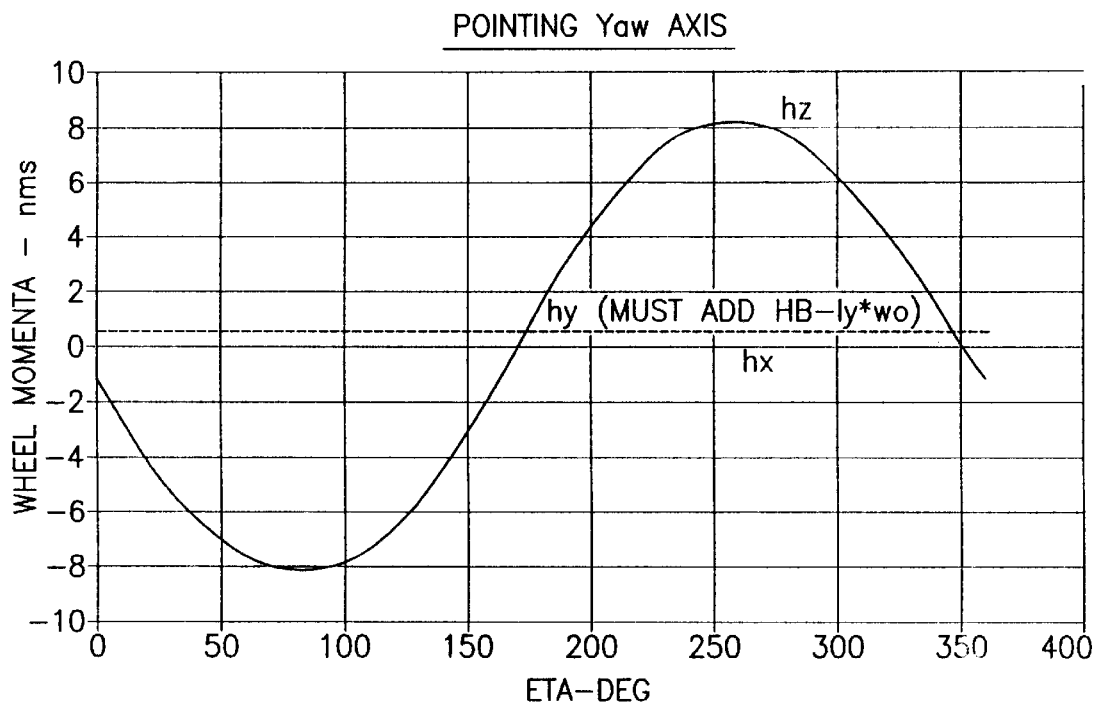
FIGS. 6a and 6b show curves representing spacecraft momentum wheel momenta values which enable the roll and pitch angles of respective FIGS. 5a and 5b to be provided.
Figure 6B:
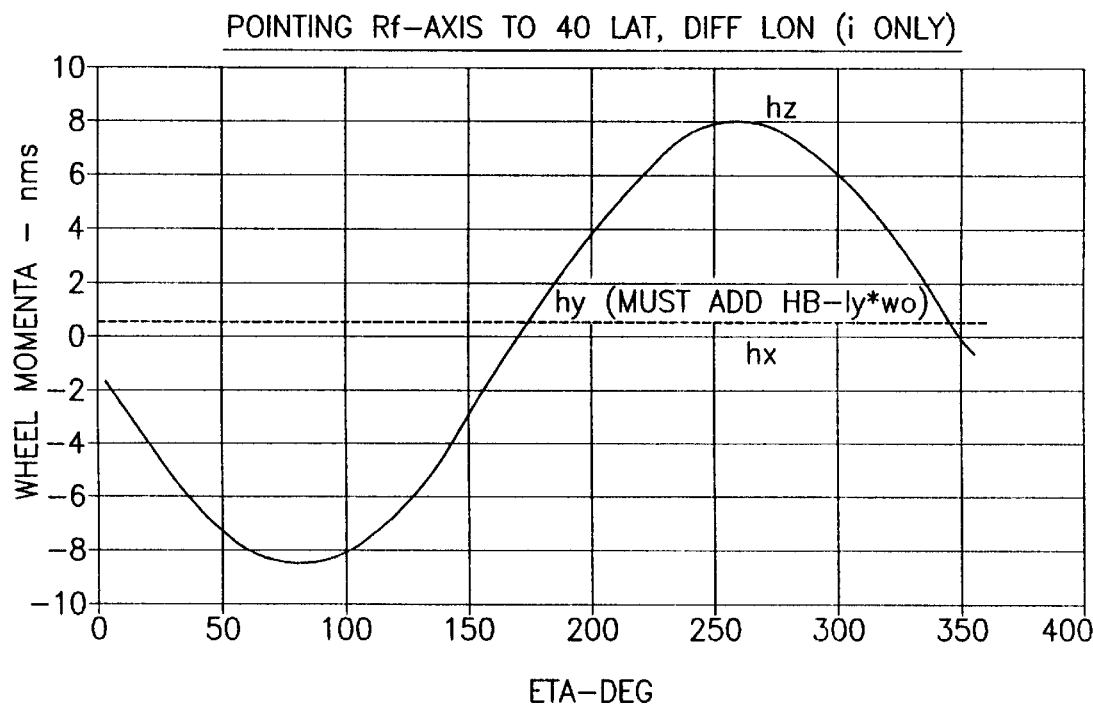

Curves representing exemplary roll and pitch angles are shown in FIGS. 5a and 5b for exemplary cases in which it is assumed that the aim point is 15 degrees east so that the pitch bias is about 2.62° for yaw axis pointing and about 1.931° for RF boresight axis pointing, respectively. Also, it is assumed that the elevation angle for the RF boresight axis is approximately 6.234°. This results in approximately a 2.62 degree pitch bias for equatorial pointing and approximately a 1.931 degree bias for 40 degree latitude pointing. In the latter case, the pitch profile is a sinusoid having the orbital frequency and an amplitude of approximately 0.254 degrees. It should be noted that it is not the "figure eight" that necessitates tile pitch motion. Rather, it is the necessity for keeping the RF boresight axis on the desired earth target which results in an angular rate about an axis perpendicular to an imaginary line "connecting" the spacecraft 10 and the target on the earth. When projected onto the orbit normal, this angular rate makes it necessary for the pitch rate to vary slightly as the spacecraft 10 travels around the orbit. Diagrams showing momentum wheel 20 momenta corresponding to the roll and pitch angles values plotted in FIGS. 5a and 5b are shown in FIGS. 6a and 6b, respectively. The amplitudes of these curves of FIGS. 6a and 6b are somewhat less than amplitudes of the curves shown in FIGS. 4a and 4b, respectively.

Third exemplary case: Higher Order Case

Figure 7A:
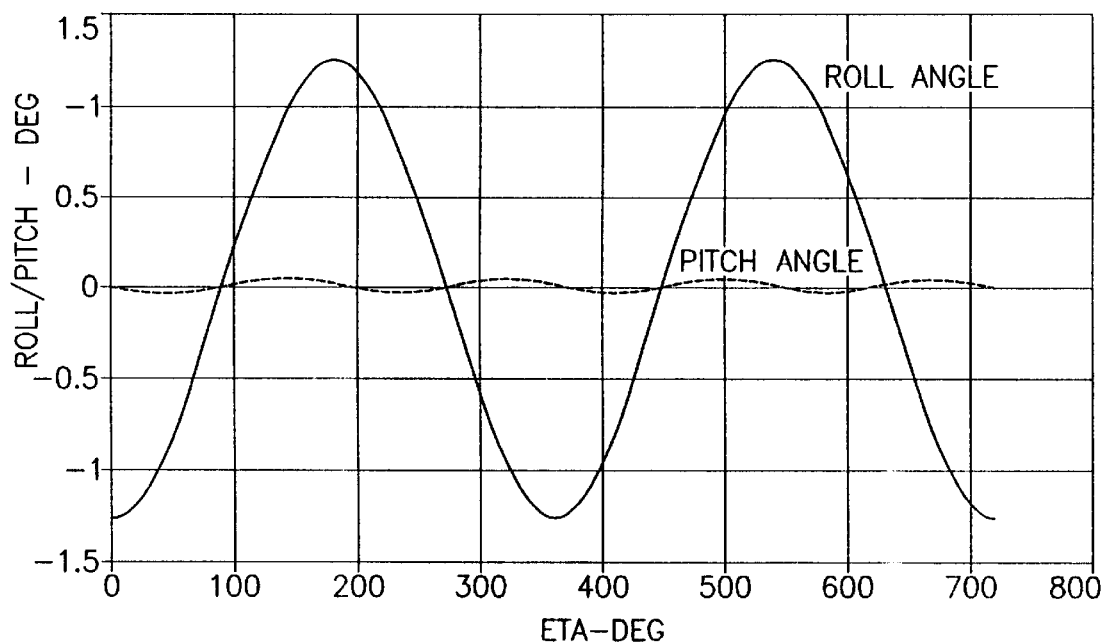
Figure 7B:
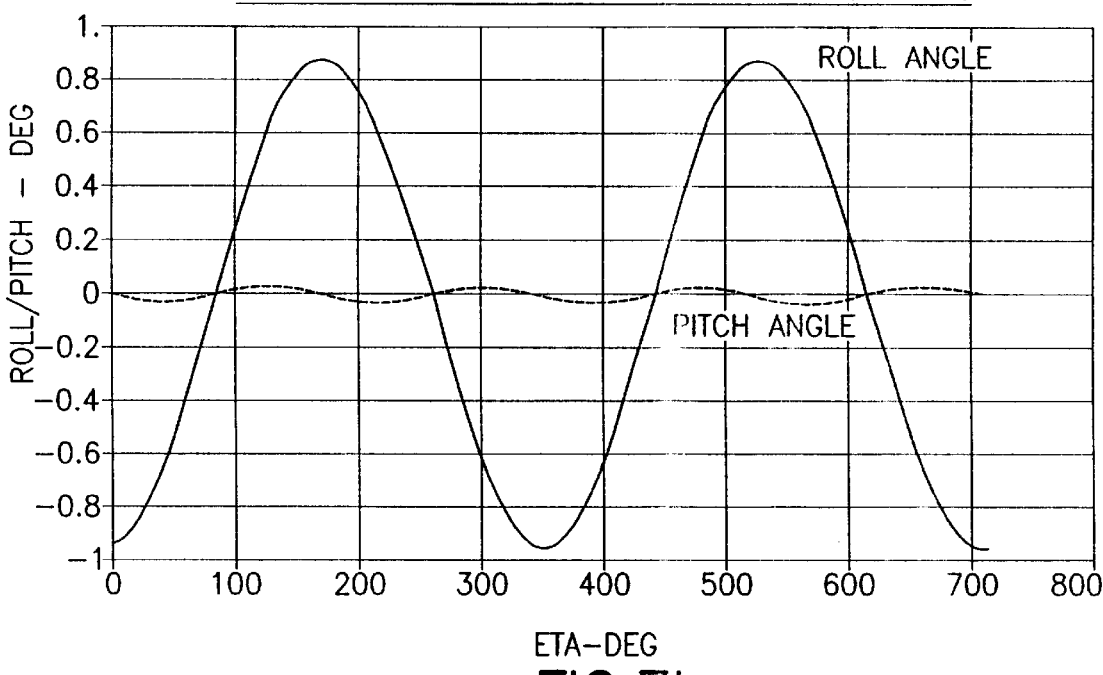
Figure 8A:
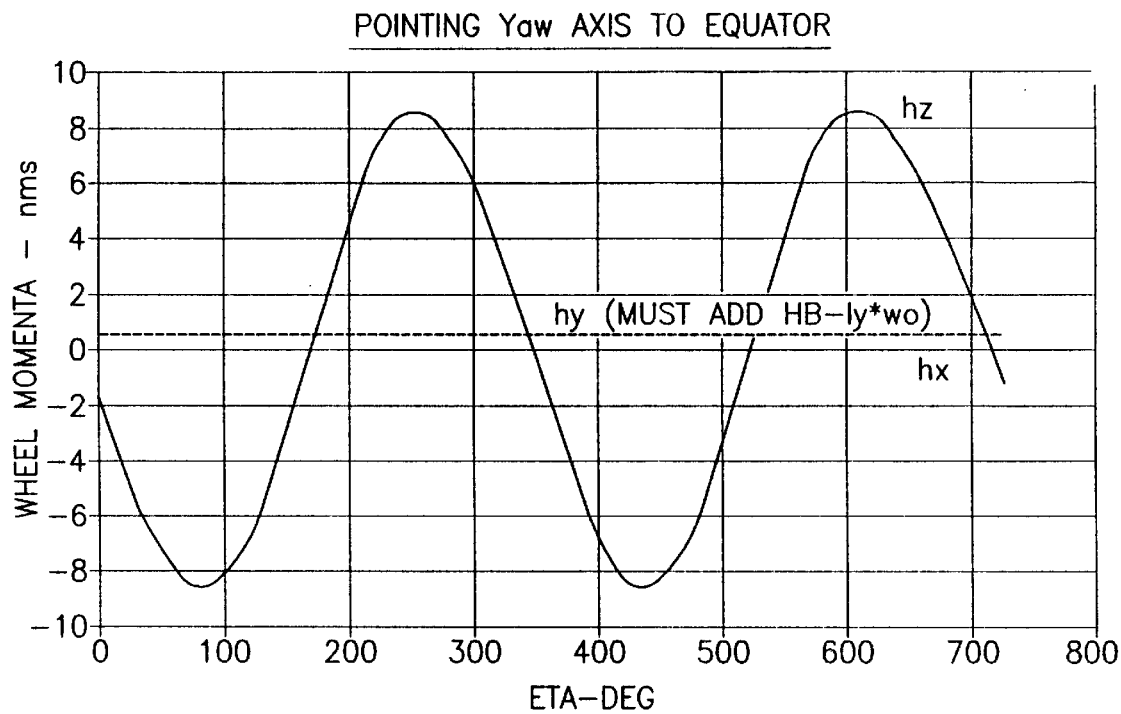
FIGS. 8a and 8b show curves representing spacecraft momentum wheel momenta values which enable the roll and pitch angles of respective FIGS. 7a and 7b to be provided.
Figure 8B:
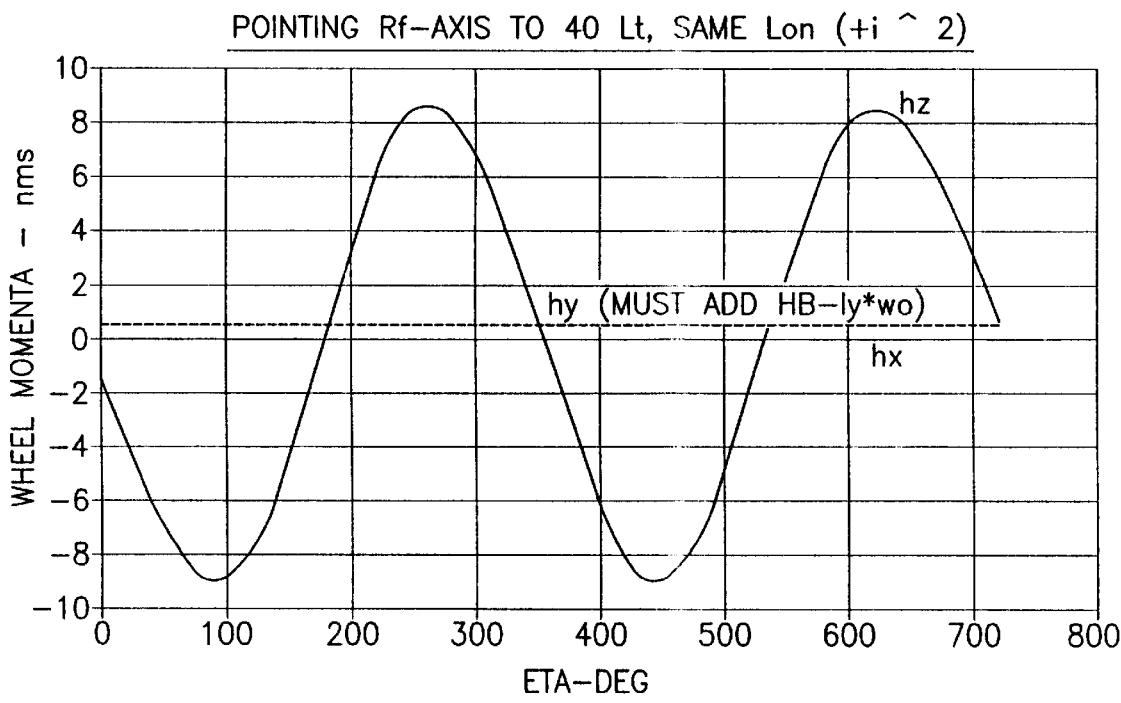

The inclusion of the term $\delta i^2$ in the above equations (17)–(19) for a higher order case contributes to a slightly higher roll angle profile relative to those of the previously described exemplary cases. By example, FIGS. 7a and 7b show curves representing exemplary roll and pitch angles (profiles) for exemplary cases in which it is assumed that the spacecraft has an aim point similar to that depicted in FIG. 2a. However, in this exemplary case, the higher order inclination term $\delta i^2$ is included in the computations. Diagrams showing momentum wheel 20 momenta corresponding to the roll and pitch angles values plotted in FIGS. 7a and 7b are shown in FIGS. 8a and 8b, respectively.

One noticeable difference between the profiles for the third exemplary case and those for the first and second exemplary cases described above is in the pitch angle profiles. More particularly, and as can be seen in FIGS. 7a and 7b, the pitch angle profile for the third exemplary case includes a sinusoid having twice the orbital frequency as the orbital frequency of the pitch angle profiles for the first two exemplary cases, owing to the inclination squared term $\delta i^2$ included in the computations for the third exemplary case. Also, as can be seen in FIG. 7b, the pointing of the RP boresight axis requires a pitch angle profile having an amplitude of about 0.275° and an orbital frequency that is twice that of the pitch angle profiles for the previously described exemplary cases.

Figure 9A:
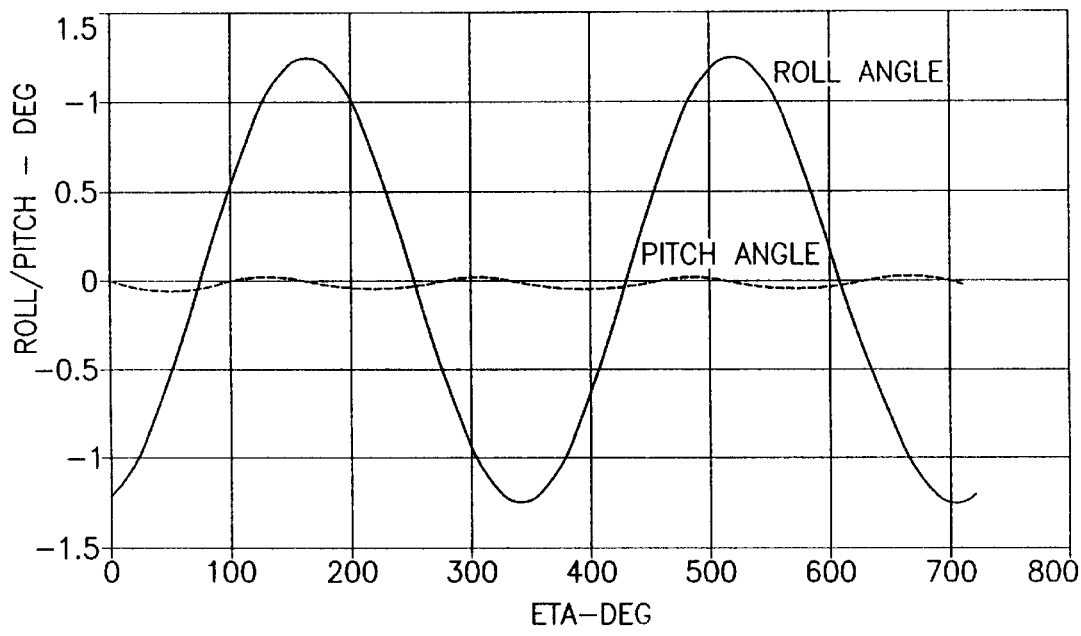
FIGS. 9a and 9b also show curves representing further exemplary spacecraft roll and pitch angle profiles.
Figure 9B:
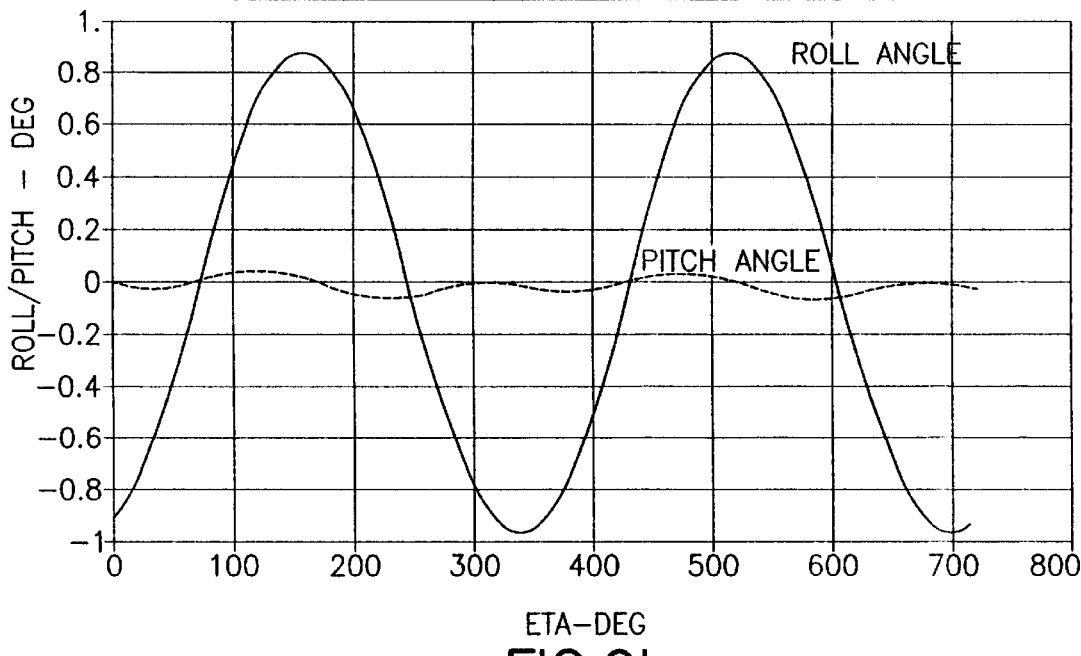
Figure 10A:
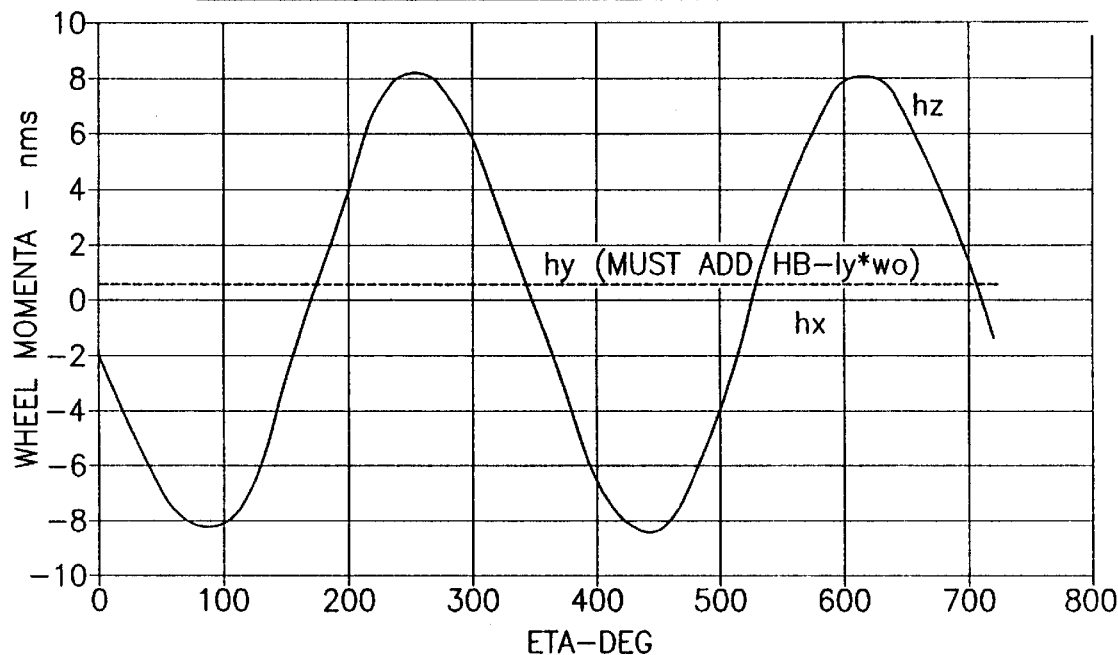
FIGS. 10a and 10b show curves representing spacecraft momentum wheel momenta values which enable the roll and pitch angles of respective FIGS. 9a and 9b to be provided.
Figure 10B:
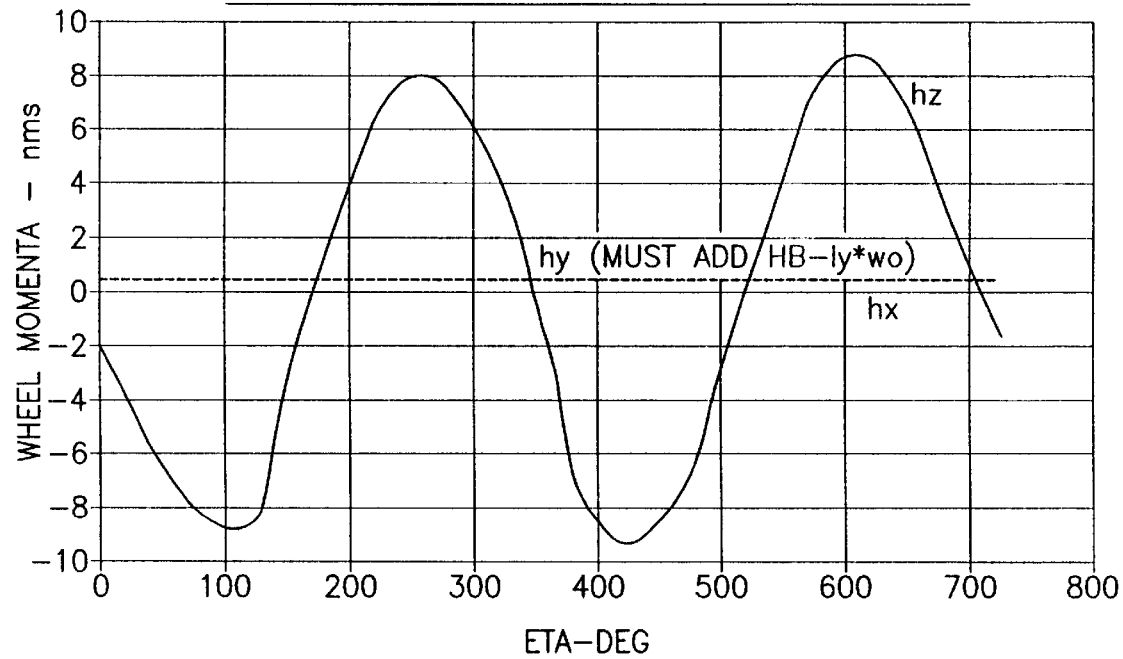

FIGS. 9a and 9b show curves representing exemplary roll and pitch angles profiles for exemplary cases in which it is assumed that the spacecraft aim point changes to a longitudinal point approximately 15° east. In this case the pitch bias is approximately 1.931° and the RF boresight axis is elevated approximately 6.234°. Also, it is noted that the pitch angle profile for this case has an amplitude of about 0.521°, and is characterized by the sum of two sinusoids, one having the orbital frequency and the other having twice the orbital frequency. Diagrams showing momentum wheel 20 momenta curves corresponding to the roll and pitch angles profiles shown in FIGS. 9a and 9b are shown in FIGS. 10a and 10b, respectively. Having described the angle and momentum profiles for the various exemplary cases described above, it is noted that for each of these exemplary cases, the primary momentum wheel 20 motion is about the spacecraft yaw axis, which is oscillatory at the orbital rate with an amplitude of about 8.5 nms. For a V-wheel system, no roll momentum wheel is preferably employed so that a yaw angle on the order of 0.1° is introduced. Also, the pitch momentum is biased to a desired level (in this case about 70 nms) with a small oscillatory profile. The momentum profiles generated in accordance with this invention enable the spacecraft 10 to maintain a desired pointing attitude in an open loop fashion. Also, it is noted that for a case in which it is necessary to point the RF boresight axis at some point away from the local longitude, the yaw angle may be measured periodically, and the yaw motion can be appropriately bounded as needed based on these measurements.

It is further noted that the difference in the RF boresight elevation angles between approximately 0° longitude and approximately 15° longitude is about 0.031° (e.g., 6.265°–6.234°=0.0310°). As such, if the spacecraft boresight axis for each aim point (or each spacecraft station) is not changed accordingly, a corresponding pointing error may result which is of a magnitude that is equal to about 0.031°, and which may cause the boresight axis to miss the desired aim point on the earth by approximately 22.8 km.

It is also further noted that in the above-described computations, spacecraft nodal regression effects can be accounted for by adding to the longitude of the ground aim point an amount that is equal to an integral of the spacecraft nodal regression rate.

Equations describing the attitude and the corresponding required angular momenta of the spacecraft 10 for pointing a fixed spacecraft axis to a desired location on the surface of the earth will now be described in greater detail. Wheel angular momentum excursions (wheel speed excursions) can be determined based on these equations, and enable momentum wheel speeds to be determined which enable the desired spacecraft pointing profile to be provided. In the following description, no wheel excursions which result from unloads (desaturation limits) are described.

Reference is now made to FIG. 2b which depicts the spacecraft 10 in the inclined orbit relative to the earth. It is assumed that the spacecraft 10 follows a substantially circular orbit, as was previously described, and that some fixed spacecraft axis (e.g., an RF antenna boresight axis) is pointing towards a particular location L1 on the surface of the earth, as shown in FIG. 2b.

The following vectors can be defined based on the depiction of the spacecraft 10 and the earth shown in FIG. 2b. For example, a vector extending between a center point of the earth and location L1 on the surface of the earth is represented by the following equation (34):

$$\vec{R}_E = R_E \vec{G}_1 = R_E[C\alpha C(\lambda+\Omega)\vec{E}_1 + C\alpha S(\lambda+\Omega)\vec{E}_2 + S\alpha \vec{E}_3] \quad (34)$$

wherein it is again noted that the earth's radius $R_1$ is approximately equal to 6377 km.

Also by example, a vector extending between the center point of the earth and the spacecraft 10 is represented by the following equation (35):

$$\vec{R}_o = R_o \vec{F}_1 \quad (35)$$

wherein $R_o$ represents the orbital radius, and is approximately equal to 42,222 km.

Also, the RF boresight axis is along the $-n_1$ vector, where $n_1$ is represented by the following equation (36):

$$\vec{n}_1 = (C\epsilon C\gamma)\vec{e}_1 + (S\epsilon)\vec{e}_2 - (C\epsilon S\gamma)\vec{e}_3 \quad (36)$$

wherein $\epsilon$ is typically equal to zero.

A further equation (37) defines a variable $\rho$, which represents a distance between the location L1 on the earth and the spacecraft 10 along the RF boresight axis. This equation (37) is defined as follows:

$$\vec{\rho} = \rho \vec{n}_1 \quad (37)$$

Programmed Attitudes

Based on the geometry represented in FIG. 2b, a vectorial relationship defined by the following equation (38) can be provided.

$$\vec{\rho} = \vec{R}_o - \vec{R}_E \quad (38)$$

By transforming this vectorial relationship to the orbit frame, the following formula (39) can be provided:

$$T_{e2F} \begin{vmatrix} C\gamma \\ 0 \\ -S\gamma \end{vmatrix} \rho = \begin{vmatrix} R_o \\ 0 \\ 0 \end{vmatrix} - T_{E2F} R_E \begin{vmatrix} C\alpha C\lambda C\Omega - C\alpha S\lambda S\Omega \\ C\alpha C\lambda C\Omega + C\alpha S\lambda S\Omega \\ S\alpha \end{vmatrix} \quad (39)$$

An expansion of this formula (39) provides the following additional formulas (40a)–(40c):

$$A_1\rho = RHS_1 \quad (40a)$$

$$A_2\rho = RHS_2 \quad (40b)$$

$$A_3\rho = RHS_3 \quad (40c)$$

wherein:

$$A_1 = [C\phi C\theta C\gamma - (S\phi S\psi + C\psi S\phi C\theta)S\gamma] \quad (41a)$$

$$A_2 = [-C\phi S\theta C\gamma - (C\theta S\psi - C\psi S\phi S\theta)S\gamma] \quad (41b)$$

$$A_3 = [-S\phi C\gamma - C\gamma C\phi S\gamma] \quad (41c)$$

and wherein $RHS_1$, $RHS_2$, and $RHS_3$ are defined in accordance with the following formulas (42a)–(42c):

$$RHS_1 = R_o - R_E x \quad (42a)$$

$$RHS_2 = -R_E y \quad (42b)$$

$$RHS_3 = -R_E z \quad (42c)$$

In formulas (42a)–(42c), the variables x, y and z are defined in accordance with the following additional formulas (43a)–(43c):

$$x = [C\eta C\alpha C(\lambda+\Omega) + S\eta CiC\alpha S(\lambda+\Omega) + S\eta SiS\alpha] \quad (43a)$$

$$y = [-S\eta C\alpha C(\lambda+\Omega) + C\eta CiC\alpha S(\lambda+\Omega) + C\eta SiS\alpha] \quad (43b)$$

$$z = [-SiC\alpha S(\lambda+\Omega) + CiS\alpha] \quad (43c)$$

Being that the following relationships (44a) and (44b) are true, it can be said that the distance from the location L1 on the surface of the earth to the spacecraft 10 is represented by the equation (45) set forth below.

$$A_1^2 + A_2^2 + A_3^2 = 1 \quad (44a)$$

$$x^2 + y^2 + z^2 = 1 \quad (44b)$$

$$\begin{aligned} \rho^2 &= RHS_1^2 + RHS_2^2 + RHS_3^2 \\ &= R_0^2 - 2R_o R_E x + R_e^2 \\ &= R_0^2 - 2R_o R_E[C\eta C\alpha C(\lambda+\Omega) + S\eta CiC\alpha S(\lambda+\Omega) + S\eta SiS\alpha] + R_E^2 \end{aligned} \quad (45)$$

Preferably, and as is generally assumed in this description, the target (located at location L1) to be tracked by the spacecraft 10 lies on substantially the same subsatellite point at each nodal crossing ($\lambda=0$), and the spacecraft's orbit rate is substantially equal to the earth's rotation rate (i.e., $d''/dt = d\Omega/dt$). To determine the spacecraft attitude required to maintain the RF boresight axis pointing towards the target, it is required to solve equations (40a)–(40c) for $\phi$, $\theta$, and $\psi$. The manner in which these equations are solved will now be described for various examplary cases.

Pointing Yaw axis to the target on the earth (y=0)

For an exemplary case wherein it is desired that the yaw axis of the spacecraft 10 be pointed towards the target located at location L1 on the earth, equations (40a)–(40c) can be rewritten as the following equations (46a)–(46c):

$$C\phi C\eta\rho = RHS_1 \quad (46a)$$

$$-C\phi S\eta\rho = RHS_2 \quad (46b)$$

$$-S\phi = RHS_3 \quad (46c)$$

These equations can be further reduced to the following relationships (47a) and (47b):

$$\tan\theta = -RHS_2/RHS_3 \quad (47a)$$

$$\sin\phi = -RHS_3/\rho \quad (47b)$$

Obviously, $\psi$ can assume any value and the yaw axis will still point to the desired point on the earth's surface.

Pointing Yaw axis to the equator

For an exemplary case wherein it is desired that the yaw axis of the spacecraft 10 be pointed towards a target that is located at the equator of the earth, y=0, variable $\alpha$ from equations (46a)–(46c) becomes equal to zero, and the equations (46a)–(46c) can be reduced to the following equations (48a) and (48b):

$$\tan\theta = \frac{-S\eta C(\lambda+\Omega) + C\eta CiS(\lambda+\Omega)}{\frac{R_o}{R_E} - [C\eta C(\lambda+\Omega) + S\eta CiS(\lambda+\Omega)]} \quad (48a)$$

$$3\sin\phi = \frac{-SiS(\lambda+\Omega)}{\sqrt{\left(\frac{R_o}{R_E}\right)^2 - 2\frac{R_o}{R_E}[C\eta C(\lambda+\Omega) + S\eta CiS(\lambda+\Omega)] + 1}} \quad (48b)$$

If the yaw axis is to point to $\lambda=0$ (subsatellite point at nodal crossings) and if the orbit is a synchronous, equatorial orbit, then $i=0$, $^n=\Omega$, and $\phi$ and $\theta$ are each equal to zero. For small inclination angles, the following further equations (49a) and (49b) are provided.

$$\delta\theta = \frac{-S\eta C\eta\delta\frac{i^2}{2}}{\frac{R_o}{R_E}-1} \quad (49a)$$

$$\delta\phi = \frac{-S\eta\delta I}{\frac{R_o}{R_E}-1} \quad (49b)$$

These equations (49a) and (49b) describe a "figure eight" about the nodal crossing. Effects of other perturbations, such as orbit eccentricities, radial distance errors, etc., may also be accounted for by introducing term $\delta^n$, as was previously described. If nodal regression effects are accounted for, appropriate terms may be introduced into Equation (39).

Pointing RF axis with Yaw constrained to zero

For an exemplary case wherein it is desired that the RF boresight axis of the spacecraft 10 be pointed towards any desired location on the earth's surface, it can be assumed that yaw is equal to zero. As a result, equations (40a)–(40c) can be reduced to the following equations (50a)–(50c):

$$C\theta C(\phi+\gamma)\rho = RHS_1 \quad (50a)$$

$$-S\theta C(\phi+\gamma)\rho = RHS_2 \quad (50b)$$

$$-S(\phi+\gamma)\rho = RHS_3 \quad (50c)$$

These equations may also be manipulated to provide the following relationships (51a) and (51b):

$$\tan\theta = -\frac{RHS_2}{RHS_1} \quad (51a)$$

$$\sin(\phi+\gamma) = -\frac{RHS3}{\rho} \quad (51b)$$

Pointing RF axis from small inclinations

In a general case, pointing to any point on the earth's surface is solved most easily by assuming small perturbations from an equatorial, synchronous orbit where the RF boresight axis is pointing nominally at a latitude of $\alpha^*$ and longitude of $\lambda=0$ (i.e., the exact subsatellite point at the nodal crossing). Thus, nominal solutions for equations (40a)–(40c), wherein $i^*\lambda^*=0$, $^{n*}=\Omega^*$, $\alpha^*=$a selected latitude, and $\phi^*=\theta^*=\psi^*=0$, may be represented as follows:

$$C\gamma^*\rho^* = R_o^* - R_E x^*$$

$$-S\gamma^*\rho^* = -R_E z^*$$

$$x^* = C\alpha^*$$

$$y^* = 0$$

$$z^* = S\alpha^* \quad (52)$$

Solving for $y^*$, the following relationship (53) is provided.

$$\tan\gamma^* = \frac{R_E z^*}{R_o^* - R_E x^*} \quad (53)$$

$$= \frac{R_E S\alpha^*}{R_o^* - R_E C\alpha^*}$$

Perturbations (including 2nd order terms in inclination) of (40a–40c) for small inclinations about the nominals are derived in Appendix B below, providing the following results:

$$\delta\phi = \frac{R_E^2 S\alpha^*}{\rho^{*2}} \cdot \frac{\delta R_o}{R_E} - \quad (54a)$$

$$\left(\frac{R_E}{\rho^*}\right)^2 \left[\left(\frac{R_o}{R_E}C\alpha - 1\right)S\eta\delta i - S\alpha^*\left(\frac{R_o}{R_E}C\alpha^* C\eta^2\right)\frac{\delta i^2}{2}\right]$$

$$\delta\theta = \frac{C\alpha^*}{\frac{R_o}{R_E} - C\alpha^*}\left[S\eta C\eta\delta\frac{i^2}{2} + \delta\eta\right] \quad (54b)$$

$$\delta\psi = C\eta\delta i \quad (54c)$$

Programmed Wheels (along spacecraft axes)

The angular momentum of the spacecraft 10 and momentum wheels 20 is given as:

$$\vec{H} = I\vec{\omega} + \vec{h} \quad (55)$$

wherein

I=spacecraft inertia matrix;

ω=spacecraft angular velocity; and h=angular momenta of momentum wheels 20.

By solving for the wheel angular momentum in the spacecraft body coordinates, the following relationship (56) is provided:

$$\vec{h} T_{F2e} T_{E2F} \vec{H} - I\vec{\omega} \quad (56)$$

The nominal solutions (for pointing of the z-axis to the equator) are represented by:

$$h^*_1 = 0$$

$$h^*_2 = 0$$

$$h^*_3 \; H_B - I_3 \omega_0 \quad (57)$$

and the perturbations about this nominal are represented by the following relationship:

$$\delta h_1 = H_B(S\eta Si - \delta\phi) + I_1(\omega_o\delta\phi + \delta\psi) \quad (58)$$

$$\delta h_2 = H_B(C\eta\delta i - \delta\psi) + I_2(\omega_o\delta\psi - \delta\phi)$$

$$\delta h_3 = -H_B \delta \frac{i^2}{2} + I_3 \delta\theta$$

Hence, the total programmed wheel angular momenta are the sums of the wheel angular momenta expressed in equations (57) and (58). The programmed attitude motions are mostly affected by small changes in inclination, and thus the following expressions may be provided:

$$\delta\phi = -\left(\frac{R_E}{p^*}\right)^2 \left(\frac{R_o}{R_E} C\alpha^* - 1\right) S\eta^* \delta i \qquad (59)$$

$$\delta\theta = -\frac{C\alpha^*}{\frac{R_o}{R_E} - C\alpha^*} - S\eta^* C\eta^* \frac{\delta i^2}{2}$$

$$\delta\psi = C\eta^* \delta i$$

As was previously described, the spacecraft body axes correspond to "usual" spacecraft axes, as is defined in accordance with the following relationship:

$$[\vec{e}_1, \vec{e}_2, \vec{e}_3] = [-\vec{z}, \vec{x}, -\vec{y}] \quad (60)$$

Programmed Wheels (V-wheel system)

In accordance with one embodiment of the invention, the spacecraft 10 has a V-wheel system that is comprised of three wheels, including two momentum wheels in the y-z plane placed symmetrically about the y-axis of the spacecraft 10, and one reaction wheel along the z-axis of the spacecraft 10. For the purposes of this description, it is assumed that the momentum of the individual momentum wheels is represented by $hm_1$ and $hm_2$, and that the momentum of the reaction wheel is represented by (hr). Accordingly, the following momentum relationships may be provided for the spacecraft 10 operating in the V-Mode (i.e., having a V-wheel system):

$$h_y = (hm1 + hm2)\cos v$$

$$h_z = (hm1 - hm2)\sin v \qquad (61)$$

By solving for $hm_1$ and $hm_2$, the following equations may be provided.

$$hm1 = \frac{h_y \sin v + h_z \cos v}{\sin 2v} \qquad (62)$$

$$hm2 = \frac{h_y \sin v - h_z \cos v}{\sin 2v}$$

By substituting values for the angular momenta required along the spacecraft axes into these expressions, the angular momenta to be programmed along the V-mode wheels may be determined.

In accordance with an embodiment of the invention wherein the spacecraft 10 has an L-wheel system (operates in an L-mode) with one momentum wheel failed, the following formulas are provided:

$$h_y = hm_i \cos v$$

$$h_z = hr \pm hm_i \sin v \quad i = 1,2 \qquad (63)$$

Also, by solving these formulas for both $hm_1$ and $hr$, the following expression (64) may be provided:

$$hm_i = \frac{h_y}{\cos v} \quad i = 1, 2 \qquad (64)$$

$$hr = h_z \pm h_y \tan v$$

By substituting values for the angular momenta required along the spacecraft axes into these expressions, the angular momenta to be programmed along the L-mode wheels may be determined.

While the present invention has been particularly described with respect to a preferred sequences of process steps and apparatus elements in the preferred embodiments thereof, it will be understood that the invention is not limited to only these particular methods and apparatus described in the preferred embodiments, nor to the particular process steps, sequences of process steps, or the various structures depicted in the drawings. On the contrary, the teachings of this invention are intended to cover all alternatives, modifications, and equivalents as may be included within the spirit and scope of the invention defined by the appended claims. In particular, the scope of the invention is intended to include, for example, variations of and alternatives to the disclosed devices and methods for achieving control of spacecraft yaw angle. In addition, other methods and/or devices may be employed to practice the methods, apparatus and system of the instant invention, as claimed, with similar results.

Having described various aspects of this invention in detail, the following Appendices A and B are provided for reference.

Appendix A

Coordinate Frames

Earth Centered Inertial Frame (Non-rotating earth)

$$(\vec{E}_1 \vec{E}_2 \vec{E}_3) \qquad (A1)$$

Orbit Frame Centered at Spacecraft Center of Gravity $$(\vec{F}_1 \vec{F}_2 \vec{F}_3) \qquad (A2)$$

wherein $-F_1$ points from the spacecraft 10 to the earth.

Target Frame Centered at the Earth's Center $$(\vec{G}_1 \vec{G}_2 \vec{G}_3) \qquad (A3)$$

wherein $G_1$ points to a point on the surface of the earth.

Spacecraft Centered Body Frame $$(\vec{e}_1 \vec{e}_2 \vec{e}_3) \quad (A4)$$

It is noted that the relationships $e_1 = -z$, $e_2 = +x$, and $e_3 = -y$, relate the e-frame to the "usual" spacecraft body frame.

RF Boresight Axis $$(\vec{n}_1 \vec{n}_2 \vec{n}_3) \qquad (A5)$$

wherein $-n_1$ points along the RF boresight axis.

Coordinate Transformations

Inertial to Orbit $$T_{E2F} = \begin{vmatrix} C\eta & S\eta & 0 \\ -S\eta & C\eta & 0 \\ 0 & 0 & 1 \end{vmatrix} \begin{vmatrix} 1 & 0 & 0 \\ 0 & Ci & Si \\ 0 & -Si & Ci \end{vmatrix} \quad (A6)$$

$$= \begin{vmatrix} C\eta & S\eta Ci & S\eta Si \\ -S\eta & C\eta Ci & C\eta Si \\ 0 & -Si & Ci \end{vmatrix}$$

wherein:

$i$ = inclination angle; and $\eta$ = orbit angle (true anomaly).

Inertial to Target $$T_{E2G} = \begin{vmatrix} C\alpha & 0 & S\alpha \\ 0 & 1 & 0 \\ -S\alpha & 0 & C\alpha \end{vmatrix} \begin{vmatrix} 1 & 0 & 0 \\ 0 & Ci & Si \\ 0 & -Si & Ci \end{vmatrix} \begin{vmatrix} C\Omega & S\Omega & 0 \\ -S\Omega & C\Omega & 0 \\ 0 & 0 & 1 \end{vmatrix} \quad (A7)$$

$$= \begin{vmatrix} C\alpha C(\lambda+\Omega) & C\alpha S(\lambda+\Omega) & S\alpha \\ -S(\lambda+\Omega) & C(\lambda+\Omega) & 0 \\ 0-S\alpha C(\lambda+\Omega) & -S\alpha S(\lambda+\Omega) & C\alpha \end{vmatrix}$$

wherein:

$i$ = latitude of target;

$\eta$ = longitude of target; and $\Omega$ = earth rotation angle.

$$T_{F2s} = \begin{vmatrix} 1 & 0 & 0 \\ 0 & C\psi & -S\psi \\ 0 & S\psi & C\psi \end{vmatrix} \begin{vmatrix} C\phi & 0 & -S\phi \\ 0 & 1 & 0 \\ S\phi & 0 & C\phi \end{vmatrix} \begin{vmatrix} C\theta & -S\theta & 0 \\ S\theta & C\theta & 0 \\ 0 & 0 & 1 \end{vmatrix} \quad (A8)$$

$$= \begin{vmatrix} C\theta C\phi & -C\phi S\theta & -S\phi \\ S\theta C\psi - S\psi S\phi C\theta & C\psi C\theta + S\psi S\phi S\theta & -S\psi C\phi \\ S\psi S\theta + C\psi S\phi C\theta & S\psi C\theta - C\psi S\phi S\theta & C\psi C\phi \end{vmatrix}$$

wherein:

$\phi$ = roll angle;

$\theta$ = pitch angle; and $\psi$ = yaw angle.

Body to RF Boresight Frame $$T_{e2n} = \begin{vmatrix} C\epsilon & S\epsilon & 0 \\ -S\epsilon & C\epsilon & 0 \\ 0 & 0 & 1 \end{vmatrix} \begin{vmatrix} C\gamma & 0 & S\gamma \\ 0 & 1 & 0 \\ -S\gamma & 0 & C\gamma \end{vmatrix} \quad (A9)$$

$$= \begin{vmatrix} C\epsilon C\gamma & S\epsilon & C\epsilon S\gamma \\ -S\epsilon C\gamma & C\epsilon & -S\epsilon S\gamma \\ -S\gamma & 0 & C\gamma \end{vmatrix}$$

wherein:

$\epsilon$ = azimuth angle; and $\gamma$ = elevation angle as measured from the yaw axis.

Appendix B

From equations (40a)–(40c), (41a)–(41c), (43a)–(43c) described above, perturbations about the nominals $i^* = \lambda^* = \phi^* = \theta^* = \psi^* = 0$, $\eta^* = \Omega^*$, are defined in accordance with the following expressions (B1):

$$A_1^* \delta\rho + \rho^* A_1 \delta R_o - R_E \delta x \quad (B1)$$

$$A_2^* \delta\rho + \rho^* \delta A_2 = -R_E \delta y \quad (B2)$$

$$A_3^* \delta\rho + \rho^* \delta A_3 = -R_E \delta z \quad (B3)$$

wherein:

$$A_1^* = C\alpha^*, A_2^* = 0, A_3^* = -S\gamma^* \quad (B4)$$

$$C\gamma^* = \frac{R_o - R_E C\alpha^*}{\rho^*}, S\gamma^* = \frac{R_E S\alpha^*}{\rho^*}$$

$$\rho^{*2} = (R_o - R_E C\alpha^*)^2 + R_E^2 S\alpha^{*2}$$

$$\delta A_1 = -S\gamma^* \delta\phi, \delta A_2 = -C\gamma^* \delta\theta - S\gamma^* \delta\psi, \delta A_3 = -C\gamma^* \delta\phi$$

By solving for $\delta\rho$ in the equations (B1) and (B3) and multiplying the solutions by $\rho^*$, the following equation (B5) is provided.

$$\rho^* \delta\rho = (R_o - R_E x^*) \delta R_o - R_E R_o \delta x + R_\epsilon (x^* \delta x + z^* \delta z) \quad (B5)$$

Assuming that $y^* = 0$, then the following expression may be provided.

$$x^* x + z^* \delta z = x^* \delta x + y^* \delta y + z^* \delta z = \frac{1}{2} \delta(x^2 + y^2 + z^2) \quad (B6)$$

Being that the following equation (B7) is true, the expression (B6) may be reduced to the form of equation (B8) below, and equation (B9) may be provided.

$$x^2 + y^2 + z^2 = 1 \quad (B7)$$

$$x^* \delta x + z^* \delta z = 0 \quad (B8)$$

$$\rho^* \delta\rho = (R_o - R_E x^*) \delta R_o - R_E R_o \delta x \quad (B9)$$

Also, based on the equations (B1) and (B3), the following equation (B10) may be provided:

$$\delta\phi = \quad (B10)$$

$$\frac{R_E}{\rho^{*2}}(R_o \delta z - z^* \delta R_o) + \left(\frac{R_E}{\rho^*}\right)^2 (z^* \delta x - x^* \delta z) = -\left(\frac{R_E}{\rho^*}\right)^2 \left[ S\alpha^* \frac{\delta R_o}{R_E} + \left(\frac{R_o}{R_E} C\alpha^* - 1\right) S\eta \delta i + S\alpha^* \left(\frac{R_o}{R_E} - C\alpha^* C^2 \eta\right) \frac{\delta i^2}{2} \right]$$

wherein:

$$\delta x = 0_* \delta\eta + S\eta S\alpha^* \delta i - S^2 \eta C\alpha^2 \frac{\delta i^2}{2} \quad (B11)$$

$$\delta y = -C\alpha^* \delta\eta + C\eta S\alpha^* \delta i - S\eta C\eta C\alpha^* \frac{\delta i^2}{2}$$

$$\delta z = 0_* \delta\eta - S\eta C\alpha^* \delta i - S\alpha^* \frac{\delta i^2}{2}$$

The equation (B1) may be expanded to provide:

$$(R_o - R_E C\alpha^*)\delta\theta = R_E\left[S\alpha^*(C\eta\delta i - \delta\psi) - C\alpha^*\delta\eta - S\eta C\eta C\alpha^*\frac{\delta i^2}{2}\right] \quad (B12)$$

Assuming that yaw is initially set equal to the inclination angle, then:

$$\delta\psi = C\eta\delta i \quad (B13)$$

Substituting the right side of relationship (B13) into the equation (B12) results in the following equation (B14) being provided:

$$\delta\theta = \frac{-C\alpha^*}{\frac{R_o}{R_E} - C\alpha^*}\left[S\eta C\eta\frac{\delta i^2}{2} + \delta\eta\right] \quad (B14)$$

What is claimed is:

1. A method for use in a spacecraft for controlling yaw angle deviations from a desired yaw angle profile, comprising steps of:
   operating a profile generator to output desired roll angle, pitch angle, yaw momentum, and yaw angle profiles, the desired profiles being calculated to meet spacecraft pointing requirements while operating in an inclined orbit;
   inputting to an observer raw roll-axis sensor measurements, commanded and measured yaw-axis wheel momentum storage, measured pitch-axis wheel momentum storage, and external roll-axis and yaw-axis torques, the observer generating a yaw angle estimate and a yaw momentum estimate;
   subtracting the yaw angle profile from the yaw angle estimate to obtain a difference value; and
   using the difference value and the yaw momentum estimate to control roll-axis thruster firings to limit spacecraft yaw angle deviations from the yaw angle profile.

2. A method as in claim 1, wherein the yaw angle profile and the yaw angle estimate are both referenced to the orbit plane of the spacecraft.

3. A method as in claim 1, wherein the external roll-axis and yaw-axis torques are obtained from solar torque and thruster firing disturbance models.

4. A method as in claim 1, wherein the desired yaw angle profile is derived from kinematics of pointing the spacecraft at the Earth, while maintaining the spacecraft momentum bias perpendicular to the Earth's equatorial plane in the inclined orbit.

5. A spacecraft comprising a control system for controlling yaw angle deviations from a desired yaw angle profile, comprising:
   a profile generator that outputs roll angle, pitch angle, yaw momentum, and yaw angle profiles, the profiles being calculated to meet spacecraft pointing requirements while operating in an inclined orbit;
   an observer for inputting raw roll-axis sensor measurements, commanded and measured yaw-axis wheel momentum storage, measured pitch-axis wheel momentum storage, and external roll-axis and yaw-axis torques, the observer generating a yaw angle estimate and a yaw momentum estimate;
   a node for subtracting the yaw angle profile from the yaw angle estimate to obtain a difference value; and
   a controller responsive to the difference value and the yaw momentum estimate for controlling roll-axis thruster firings to limit spacecraft yaw angle deviations from the yaw angle profile.

6. A spacecraft as in claim 5, wherein the yaw angle profile and the yaw angle estimate are both referenced to the orbit plane of the spacecraft.

7. A spacecraft as in claim 5, wherein the external roll-axis and yaw-axis torques are obtained from solar torque and thruster firing disturbance models.

8. A spacecraft as in claim 5, wherein said profile generator derives the desired yaw angle profile from kinematics of pointing the spacecraft at the Earth, while maintaining the spacecraft momentum bias perpendicular to the Earth's equatorial plane in the inclined orbit.

* * * * *